(12) United States Patent
Ogawa (10) Patent No.: US 6,623,582 B1
(45) Date of Patent: *Sep. 23, 2003

(54) PRODUCTION OF TIRE CARCASS (75) Inventor: Yuichiro Ogawa, Fuchu (JP)

(73) Assignee: Bridgestone Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 09/713,229

(22) Filed: Nov. 16, 2000

(30) Foreign Application Priority Data

Nov. 19, 1999  (JP) ............................................ 11-329229

(51) Int. Cl.$^7$ ............................................... B29D 30/16
(52) U.S. Cl. ...................... 156/117; 156/135; 156/397; 156/398
(58) Field of Search ................................ 156/117, 133, 156/123, 397, 421.6, 398, 130.7, 135; 152/548, 560, 562, 558

(56) References Cited

U.S. PATENT DOCUMENTS

| 1,259,997 | A | * | 3/1918 | Kline ......................... 156/397 |
| 3,815,652 | A | | 6/1974 | Pouilloux |
| 4,240,863 | A | * | 12/1980 | Vinton ........................ 156/397 |
| 4,830,781 | A | * | 5/1989 | Oswald ...................... 152/560 |
| 5,453,140 | A | * | 9/1995 | Laurent et al. ............. 156/117 |
| 6,135,184 | A | * | 10/2000 | Fyfe ............................ 152/548 |
| 6,318,432 | B1 | * | 11/2001 | Caretta et al. .............. 156/117 |
| 6,328,836 | B1 | * | 12/2001 | Ogawa ........................ 156/117 |

FOREIGN PATENT DOCUMENTS

| EP | 0 962 304 A2 | 12/1999 |
| EP | 1 101 597 A2 | 5/2001 |
| JP | A 9-147512 | 6/1997 |
| JP | A 10-226203 | 8/1998 |
| JP | A 11-198247 | 7/1999 |

OTHER PUBLICATIONS

Patent Abstracts of Japan, vol. 015, No. 252 (C–0844), Jun. 26, 1991 & JP 03 081241 A, Apr. 5, 1991.

Shun–Ichi Murahashi: "Aerobic oxidation of alkanes and alkenes in the presence of aldehydes catalyzed by copper salts and copper–crown either"; Journal of Molecular Catalysis, No. 117, 1997, pp. 21–37.

\* cited by examiner

*Primary Examiner*—Geoffrey L. Knable
(74) *Attorney, Agent, or Firm*—Oliff & Berridge, PLC (57) ABSTRACT

An apparatus for producing a tire carcass having bead portions which are substantially free from cut surfaces of carcass cords. The apparatus includes a substantially toroidal carrier for supporting a rubber member of a tire. An indexing mechanism causes an indexing movement of the carrier by a predetermined angle about a rotational axis of the carrier. A feed mechanism continuously feed a carcass cord toward an outer surface of the carrier, wherein the feed mechanism are reciprocable in the axial direction of the carrier within a surface region thereof, that extends axially of the carrier at least between positions of the carrier corresponding to a bead portion and a tread end portion of a tire, respectively. Pressure mechanisms forming at least a pair are arranged adjacent to opposite ends of the surface region of the carrier, respectively, so that the carcass cord fed from the feed mechanism is wound about the respective pressure mechanisms and urged thereby toward the outer surface of the carrier.

6 Claims, 8 Drawing Sheets

PRODUCTION OF TIRE CARCASS

BACKGROUND OF THE INVENTION

1. Field of the Invention

The present invention relates a method of, and an apparatus for producing tire carcass.

2. Description of the Related Art

Conventionally, a pneumatic tire is produced by a method in which a plurality of carcass cords are aligned and coated by rubber to form a rubber strip, which is then cut into a rubber sheet having a predetermined constant length. The rubber sheet is wound around an inner linear supported on a drum, and both ends of the rubber sheet are joined to each other. Subsequently, bead cores are fitted over the rubber sheet on both sides of the drum to form a tire carcass belt layer. The edges of the carcass belt layer are then folded about the bead cores and additional tire members, such as side rubbers and the like, are wound over the folded portions of the carcass belt layer to form a green case. The green case is then shaped into a toroidal green tire, which is then subjected to vulcanization and other steps necessary to form a product tire.

With the above-mentioned conventional tire production method, it is inevitable that a number of cut surfaces of the carcass cord are successively arranged along the folded portions of the carcass, and subjected to stress concentrations during use of the tire. Due to severe stress concentration at the cut surfaces of the carcass cord, that tends to be caused under extreme use conditions of the tire, there may occur interlayer separations at the cord ends, or other serious defects at the tire bead portions.

In view of the above-mentioned problems arising from the conventional method, JP-A-10-226,203 discloses a tire in which the bead portions are essentially free from cut surfaces of the carcass cord. In this instance, the carcass of the tire has a substantially cordless center portion which is formed by continuously applying, on each side of the tire, a carcass cord in a zigzag manner so that the cord is reciprocated between the bead core portion and that portion of the carcass belt layer which corresponds to the side edge portion of the tread rubber layer. However, except that the carcass cod is to be applied in a zigzag manner on each side of the tire, JP-A-10-226,203 does not disclose concrete measures which can be effectively used for practical production of the tire carcass.

SUMMARY OF THE INVENTION

It is highly desirable, and is thus a primary object of the present invention, to realize a practical technology for producing a tire carcass in which the bead portions are free from cut surfaces of the carcass cord. Such a technology should ensures that the carcass can be produced efficiently, without requiring noticeably complicated hardware arrangement.

According to one aspect of the present invention, there is provided an apparatus for producing a tire carcass, comprising: a substantially toroidal carrier for supporting a rubber member of a tire; an indexing mechanism for causing an indexing movement of the carrier by a predetermined angle about a rotational axis of the carrier; a feed mechanism having an outlet guide for feeding a carcass cord toward an outer surface of the carrier, said feed mechanism being reciprocable in the axial direction of the carrier within a surface region thereof, that extends axially of the carrier at least between positions of the carrier corresponding to a bead portion and a tread end portion of a tire, respectively; and pressure mechanisms forming at least a pair are arranged adjacent to opposite ends of said surface region of the carrier, respectively, so that the carcass cord fed from the feed mechanism is wound about the respective pressure mechanisms and urged thereby toward the outer surface of the carrier.

The pressure mechanisms may be arranged adjacent to those positions of the carrier, which correspond to opposite bead portions of a tire, respectively. Additionally, or alternatively, the pressure mechanisms may be arranged adjacent to those positions of the carrier, which correspond to the bead portion and the tread end of the tire, respectively.

The apparatus according to the present invention may comprise two pairs of the pressure mechanisms arranged adjacent to those portions of the carrier, which correspond to opposite bead portions and opposite tread ends of the tire, respectively.

Preferably, the pressure mechanisms each comprise a pin about which the carcass cord can be would, drive means for moving the pin into, and out of contact with the outer surface of the rubber member on the carrier, and a pressure member for urging the carcass cord, which has been wound about the pin, toward the outer surface of the rubber member on the carrier.

The apparatus according to the present invention may further comprise at least one deflection mechanism arranged between the pressure mechanisms forming a pair, for changing the direction in which the carcass cord extends along the outer surface region of the carrier.

The feed mechanism may comprise a three-axes actuator that is adapted to move the carcass cord along the outer surface of the carrier.

According to another aspect of the present invention, there is provided a method of producing a tire carcass, comprising the steps of: supporting a rubber member on a substantially toroidal carrier; operating an indexing mechanism and thereby causing an indexing movement of the carrier by a predetermined angle about a rotational axis of the carrier; operating a feed mechanism synchronously with the indexing mechanism, so that said feed mechanism is reciprocated in the axial direction of the carrier within a surface region thereof, that extends axially of the carrier at least between positions of the carrier corresponding to a bead portion and a tread end portion of a tire, respectively, and a carcass cord is fed through an outlet guide in the feed mechanism toward an outer surface of the carrier; and operating at least a pair of pressure mechanisms synchronously with the indexing mechanism, said pressure mechanisms being arranged adjacent to opposite ends of said surface region of the carrier, respectively, so that the carcass cord fed from the feed mechanism is wound about the respective pressure mechanisms and urged thereby toward the outer surface of the carrier.

In the method according to the present invention, at least one deflection mechanism may be provided between the pressure mechanisms. In this instance, the carcass cord is engaged with the deflecting mechanism so as to change the direction of the carcass cord along the outer surface region between said pressure mechanisms and thereby form a carcass in which the carcass cord has a deflected center region.

In the method according to the present invention, furthermore, the feed mechanism and the pair of pressure mechanisms may be provided for each side of the tire. In this instance, the feed mechanism and the pressure mechanisms on one side of the tire are operated simultaneously with the corresponding feed mechanism and the corresponding pressure mechanisms on the other side of the tire, respectively.

DETAILED DESCRIPTION OF THE PREFERRED EMBODIMENTS

The present invention will be explained below in further detail, with reference to the preferred embodiments shown in the drawings. It is noted that the same reference numerals or characters are used throughout the figures, to denote the same or corresponding elements.

Figure 1:
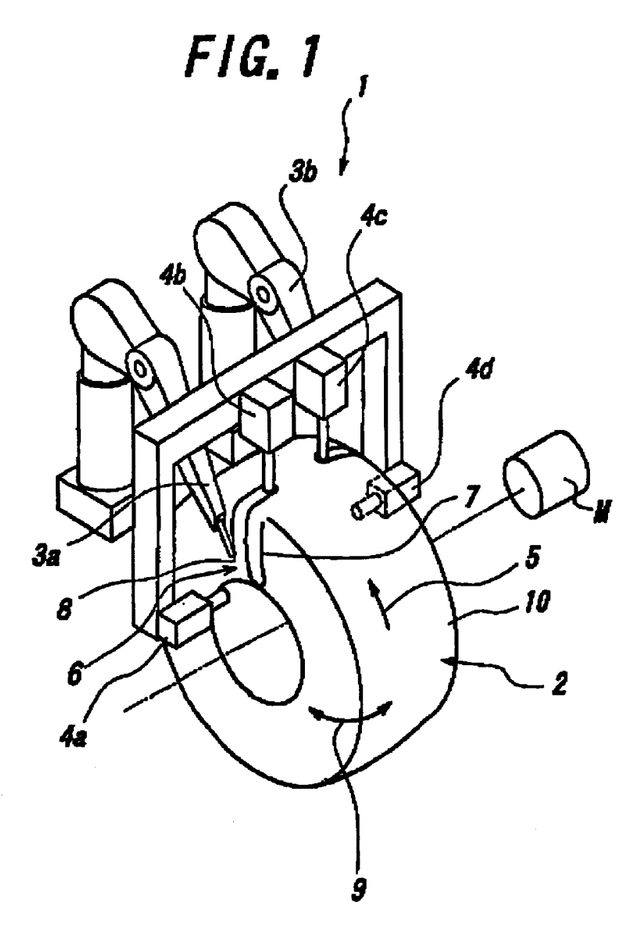
FIG. 1 is a perspective view showing the apparatus for producing tire carcasses according to a first embodiment of the present invention.

With reference to FIG. 1, there is shown an apparatus for producing a tire carcass according to a first embodiment of the present invention. The apparatus is designated as a whole by reference numeral 1, and is comprised of a substantially toroidal carrier 2, an indexing mechanism represented by a servomotor M or the like, a pair of feed mechanisms 3a, 3b, and a plurality of pressure mechanisms 4a to 4d.

The carrier 2 has a substantially toroidal outer shape and serves to support thereon an inner liner or the like rubber member 18. The outer shape of the carrier 2 corresponds, at least approximately, to the inner surface of the tire to be produced. The carrier 2 may be in the form of a rigid core or a flexible bladder, which can be inflated into the desired three-dimensional inner surface shape of the tire.

The indexing mechanism including the servomotor M in the illustrated embodiment serves to cause an indexing movement of the carrier 2 by a predetermined angle about the rotational axis of the carrier 2. The predetermined angle for indexing the carrier 2 corresponds, for example, to a pitch of a carcass 6A as measured in the circumferential direction of the carrier 2 indicated by an arrow 5, with which the carcass cord is applied in a zigzag manner. Although a detailed illustration is omitted for the sake of simplicity, the output shaft of the servomotor M can be connected to a support shaft for the carrier 2, through an appropriate coupling. The support shaft is arranged coaxially to the carrier 2 such that they can be rotated jointly.

The feed mechanisms 3a, 3b each include an outlet guide 8 for guiding a carcass cord 7 and feeding it toward the outer surface of the carrier 2. The feed mechanisms 3a, 3b are each reciprocable in the axial direction of the carrier, i.e., the width direction of the tire, within an outer surface region 9 of the carrier 2, that extends between the positions corresponding to the bead portion and the tread end portion of the tire, respectively. It is preferred that each feed mechanism 3a, 3b is in the form of a three-axes actuator which allows the outlet guide 8 to be moved along the outer surface 10 of the carrier 2 in its axial direction. Such an actuator is readily available on the market as a versatile industrial robot. In the embodiment shown in FIG. 1, the feed mechanisms 3a, 3b are arranged in pair, for opposite sides of the carrier 2, respectively, and operated synchronously with the indexing mechanism and also with each other so as to form both side portions of the carcass layer simultaneously. However, in accordance with various design requirements relating to the structure of the carcass layer, the number of the feed mechanism 3a, 3b may be either decreased or increased.

The pressure mechanisms 4a to 4d are arranged opposite to respective end portions of the above-mentioned outer surface region 9 of the carrier 2, i.e, at the bead portion and the tread end portion of the tire, so that the carcass cord 7 continuously supplied from the feed mechanism 3a or 3b can be wound around a tip end portion of the pressure mechanism 4a, 4b, 4c or 4d and urged by it toward the carrier 2.

Figure 2:
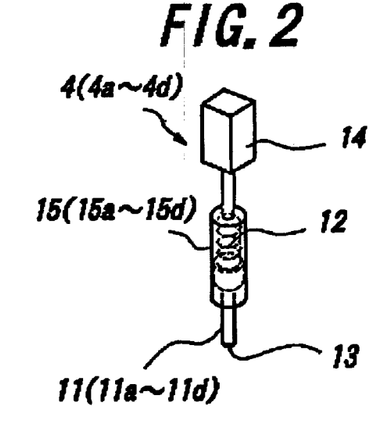
FIG. 2 is a perspective view showing a pressure mechanism.

As particularly shown in FIG. 2, it is preferred that each pressure mechanism 4 comprises a pin 11 which is normally biased by a compression spring 12 toward the carrier 2, and a pressure block 15 substantially in the form of a hollow cylindrical body accommodating the spring 12 and part of the pin 11. The pressure block 15 is coaxial with the pin 11 and is secured to the free end of a linear actuator 14, e.g., a pneumatic or hydraulic cylinder device, so that it can be moved toward and away from the carrier 2. In order to achieve an improved adhesion of the carcass cord 7 to the rubber member 18, it is preferred that the pressure block 15 is provided therein with an appropriate heating element, not shown.

The number of pressure mechanisms 4a to 4d may be determined in accordance with various design requirements relating to the structure of the carcass layer. Thus, for example, when it is desired to produce a carcass 6A having a substantially cordless center region, it is preferred that four pressure mechanisms 4a to 4d are arranged to form two pairs on opposite sides of the carrier 2, as shown in FIG. 1. In this instance, the pressure mechanism 4a, 4b forming a first pair are arranged adjacent to those positions of the carrier 2 on its one side, which correspond to the bead portion and the tread end of the tire, respectively. Similarly, the pressure mechanism 4c, 4d forming a second pair are arranged adjacent to those positions of the carrier 2 on its another side, which corresponding to the tread end and the bead portion of the tire, respectively.

The manner of production of a tire carcass, in conjunction with the operation of the apparatus of FIG. 1 explained above, will be described below with reference to FIGS. 3(a) to 3(h).

Figure 3A:
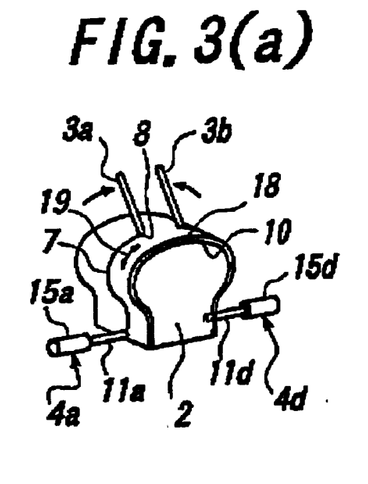
FIGS. 3(a) to 3(h) are explanatory views showing successive steps for producing a carcass having a substantially cordless center region with the apparatus of FIG. 1.

In step 1, it is assumed that an inner liner or the like rubber member 18 is supported on the outer peripheral surface of the carrier 2, and the leading ends of the carcass cords 7 on both sides of the tire are tightly retained by the pins 11a, 11d of the pressure mechanisms 4a, 4d, respectively, at positions of the rubber member 18 corresponding to the bead portions of the tire. As shown in FIG. 3(a), the feed mechanisms 3a, 3b are moved in the meridian direction of the carrier 2 toward the respective positions of the rubber member 18 corresponding to the tread ends of the tire, while continuously feeding the carcass cords 7 from the outer guides 8 of the feed mechanisms 3a, 3b and applying them onto the outer surface of the rubber member 18.

Figure 3B:
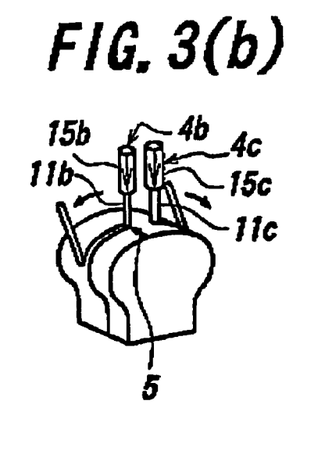

In step 2, as shown in FIG. 3(b), when the feed mechanisms 3a, 3b have reached the tread end positions of the rubber member 18, the pins 11b, 11c of the pressure mechanisms 4b, 4c situated above the tread end positions are moved downwards until they are resiliently brought into contact with the rubber member 18. Subsequently, the indexing mechanism is actuated to rotate the carrier 2 by a predetermined pitch angle, and the feed mechanisms 3a, 3b are moved back in the meridian direction of the carrier 2 toward the positions corresponding to the bead portions of the tire. By this, the carcass cords 7 are wound around the pins 11b, 11c to extend in substantially reversed directions.

Figure 3C:
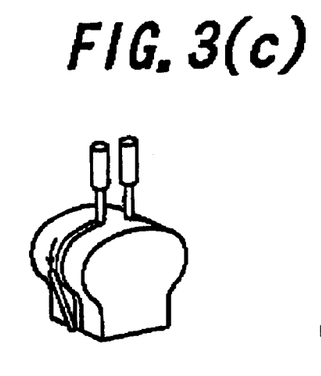

In step 3, as shown in FIG. 3(c), while the feed mechanisms 3a, 3b are moved toward the respective positions corresponding to the bead portions of the tire, the pressure mechanisms 4b, 4c are operated and the carcass cords 7 around the pins 11b, 11c are thus urged by the pressure blocks 15b, 15c against the rubber member 18 so that the carcass cords are tightly adhered to the tread end positions of the rubber member 18.

Figure 3D:
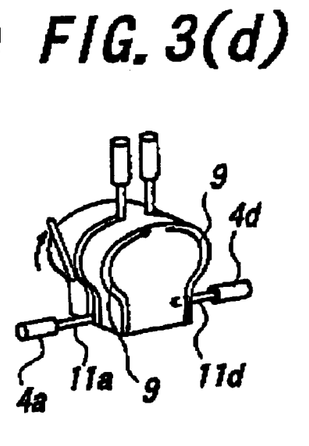
Figure 3E:
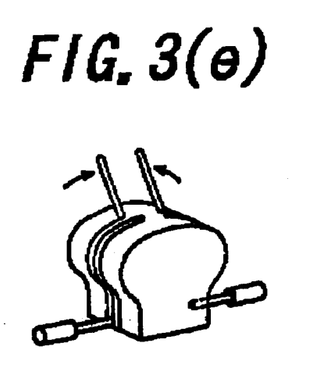
Figure 3F:
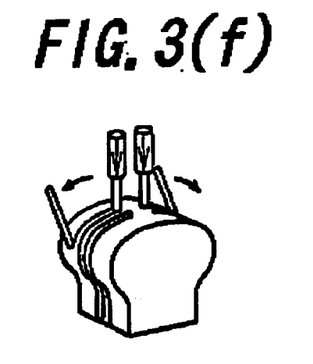
Figure 3G:
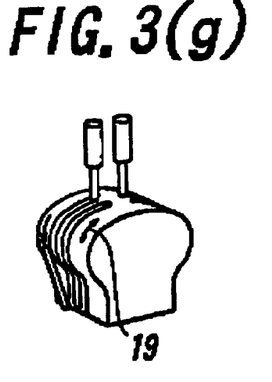
Figure 3H:
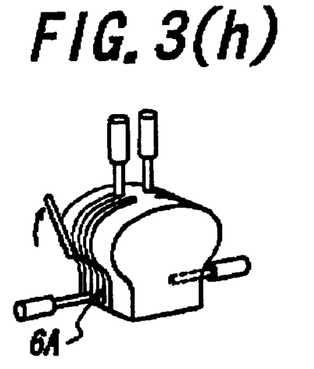

In step 4, as shown in FIG. 3(d), when the feed mechanisms 3a, 3b have reached the respective positions corresponding to the bead portions of the tire, the pins 11a, 11d of the pressure mechanisms 4a, 4d situated above the feed mechanisms 3a, 3b are moved downwards until they are resiliently brought into contact with the rubber member 18, and the indexing mechanism is then actuated to rotate the carrier 2 by a predetermined pitch angle so that the carcass cords 7 are wound around the pins 11a, 11d to extend in substantially reversed directions.

Subsequently, the pressure mechanisms 4a, 4d are operated and the carcass cords 7 around the pins 11a, 11d are thus urged by the pressure blocks 15a, 15d against the rubber member 18 so that the carcass cords are tightly adhered to the tread end positions of the rubber member 18. This condition corresponds to the initial condition for the step 1 explained above. Then, steps 5 to 8 are successively performed, which are essentially the same as the above-mentioned steps 1 to 4, respectively. In this way, it is possible to apply the carcass cords 7 on the outer surface of the rubber member 18 in a zigzag manner as seen in the circumferential direction 5 of the carrier 2.

Figure 4A:
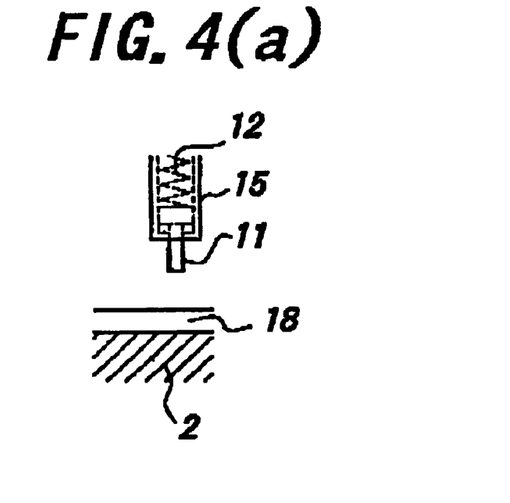
FIGS. 4(a) to 4(d) are explanatory views showing the operation of the pressure mechanism of FIG. 2.
Figure 4B:
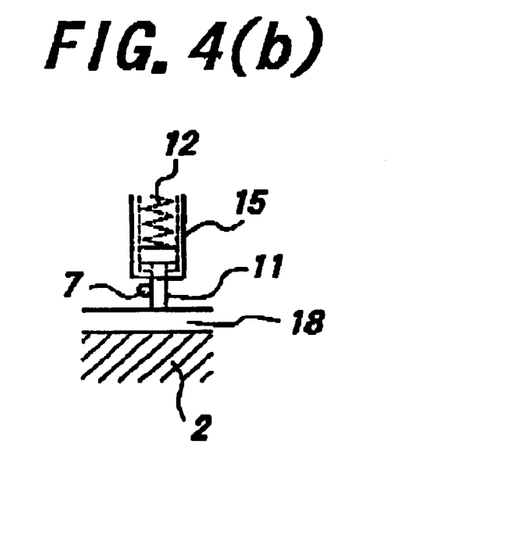
Figure 4C:
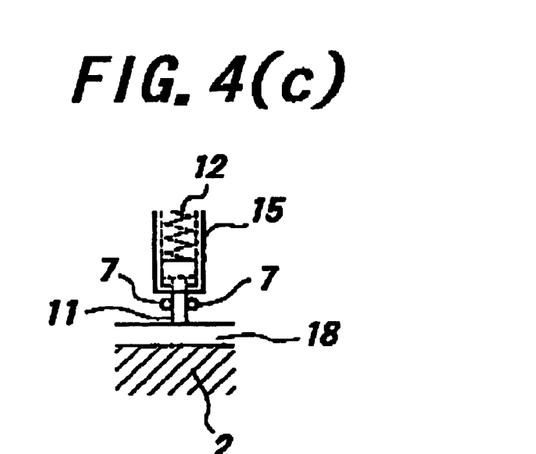
Figure 4D:
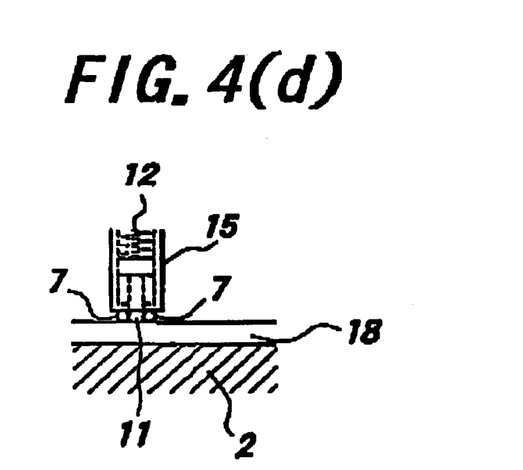

The above-mentioned operation of the pressure mechanisms 4 is illustrated in FIGS. 4(a) to 4(d). Thus, the pressure mechanism 4 is initially situated above the rubber member 18, as shown in FIG. 4(a). When the corresponding feed mechanism 3a, 3b reaches the predetermined position, the pressure mechanism 4 is moved downward so that the pin 11 is resiliently brought into contact with the rubber member 18 and the carcass cord 7 is wound around the pin 11, as shown in FIGS. 4(b) and 4(c). Then, the pressure block 15 is further moved downwards by the linear actuator 14. The pin 11 is supported by the pressure block 15 and normally biased toward the carrier 2 so that the carcass cord 7 is tightly urged against the rubber member 18, as shown in FIG. 4(d). Thus, the pin 11 and the pressure block 15 are moved in respective sequence toward the carrier 2 to secure the carcass cord 7 to the outer surface of the rubber member 18.

Figure 5A:
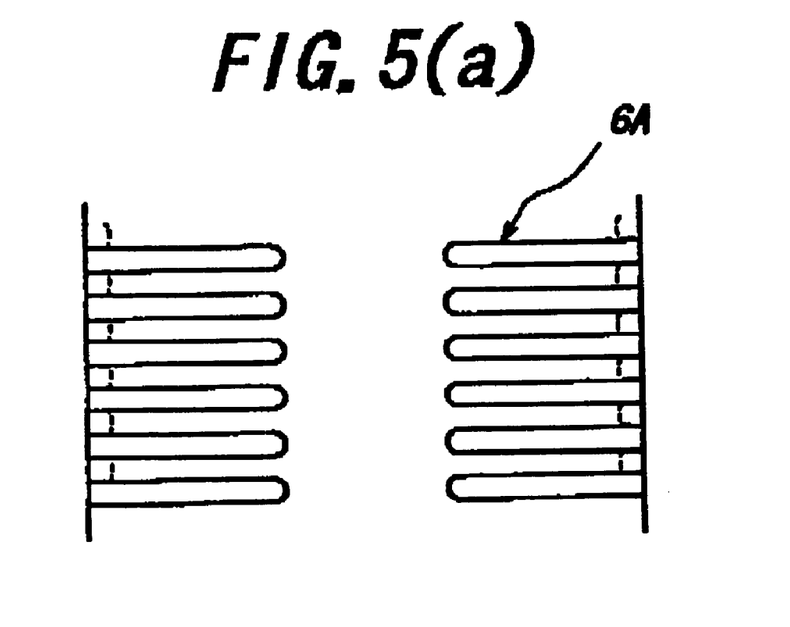
FIGS. 5(a) and 5(b) are plan view and perspective view, respectively, of the carcass produced by the steps of FIGS. 3(a) to 3(h)
Figure 5B:
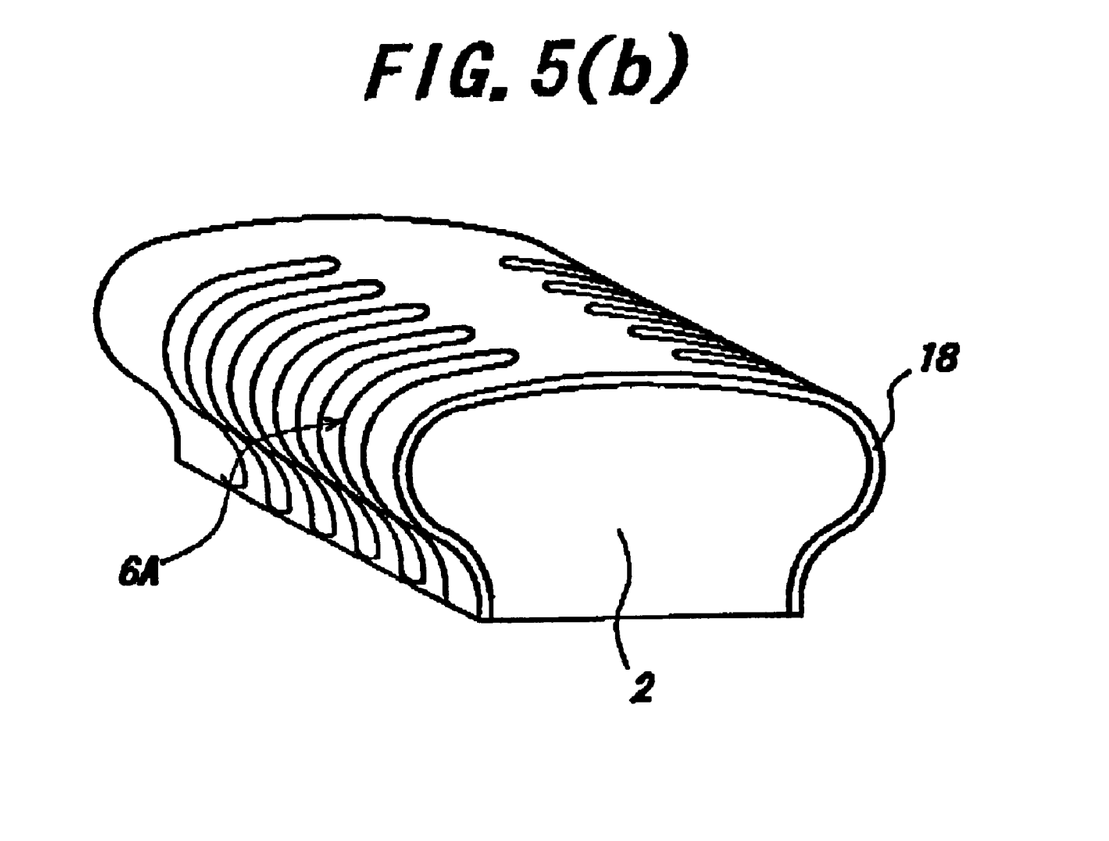

The carcass 6A produced by the apparatus according to the above-mentioned first embodiment is shown in FIGS. 5(a) and 5(b). It can be seen that the carcass 6A has a substantially cordless center portion and bead portions which are completely free from undesirable carcass cord cut surfaces.

Figure 6:
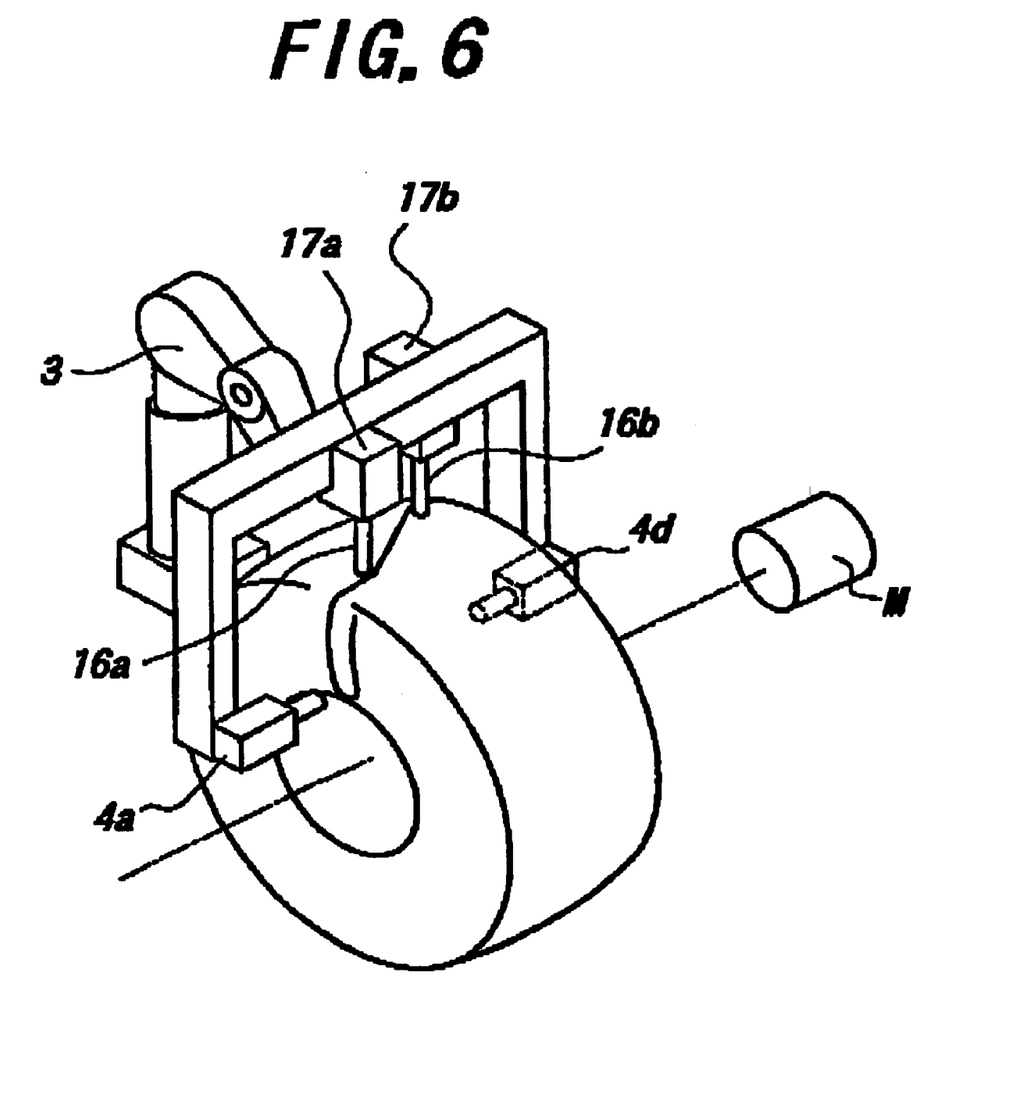
FIG. 6 is a perspective view similar to FIG. 1, showing the apparatus according to a second embodiment of the present invention.

With reference to FIG. 6, there is shown an apparatus for producing a tire carcass according to a second embodiment of the present invention, which is generally the same as the first embodiment shown in FIG. 1. It is noted that the apparatus shown in FIG. 6 is designed for producing a tire carcass wherein a single carcass cord extends over the entire surface of the carrier 2, i.e., continuously between the opposite bead portions of the tire. The carcass cord 7, which is present at the center portion of the carcass, has a deflected configuration so that it extends in the width direction of the tire forming a predetermined angle relative to the rotational axis of the carrier 2.

To this end, the apparatus 1 includes a single feed mechanism 3 and two pressure mechanisms 4a, 4d arranged adjacent to the positions of the carrier 2 which correspond to the bead portions of the tire, respectively. Instead of the pressure mechanisms 4b, 4c adjacent to the tread center positions as in the first embodiment, there is provided at least one deflecting mechanism that is situated at a position between the pressure mechanisms 4a, 4d.

The apparatus 1 shown in FIG. 6 is provided, for instance, with two deflecting mechanisms 17a, 17b which may be arranged at the tread end positions of the carrier 2, respectively. The deflecting mechanisms 17a, 17b are each comprised of a pin 16a, 16d with which the carcass cord 7 continuously fed from the feeding mechanism 3 is engaged to change the direction of the cord 7 within a center region of the carcass between the opposite tread end positions, thereby forming a deflected portion 20a, 20b.

When it is desired or necessary that the carcass cord in the deflected portion 20a, 20b is positively adhered to the outer surface of the rubber member 18, the deflecting mechanisms may be each provided with a spring, pressure block and/or heater, in the same manner as the pressure mechanism, The manner of production of a tire carcass, in conjunction with the operation of the apparatus of FIG. 6 explained above, will be described below with reference to FIGS. 7(a) to 7(h).

Figure 7A:
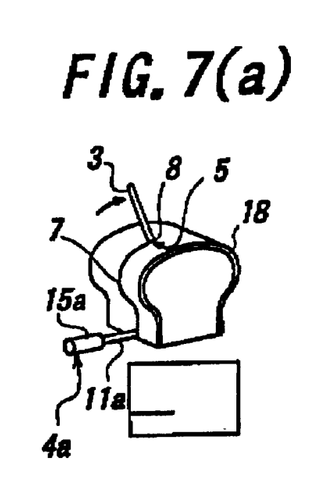
FIGS. 7(a) to 7(h) are explanatory views showing successive steps for producing a carcass having a deflected center region by using the apparatus of FIG. 6.

In step 1, it is assumed that a rubber member 18, such as an inner linear, is supported on the outer peripheral surface of the carrier 2, and the leading end of the carcass cord 7 is tightly retained by the pin 11a of the pressure mechanism 4a, at a position of the rubber member 18 corresponding to the bead portion of the tire. As shown in FIG. 3(a), the feed mechanism 3 is moved in the meridian direction of the carrier 2 toward the position of the rubber member 18 corresponding to the tread end of the tire, while continuously feeding the carcass cords 7 from the outlet guide 8 of the feed mechanism 3 and applying it onto the outer surface of the rubber member 18.

Figure 7B:
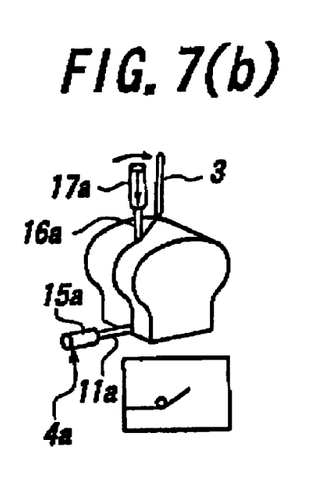

Step 2 is performed while the feed mechanism 3 continuously feeding the carcass cord is moved toward the opposite bead portion of the tire. Thus, as shown in FIG. 7(b), when the feed mechanism 3 has reached the tread end position of the rubber member 18, the pin 16a of the deflecting mechanism 17a situated above the tread end position is moved downwards until it is brought into contact with the rubber member 18, to change the direction of the carcass cord at the position of the pin 16a and thereby form a deflecting point 20a of the carcass cord.

Figure 7C:
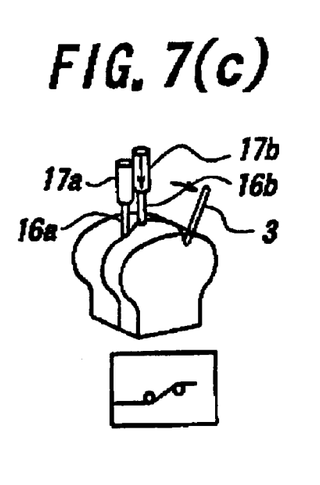

Step 3 is similar to step 2 in that it is also performed while the feed mechanisms 3 continuously feeding the carcass cord is moved toward the opposite bead portion of the tire. Thus, as shown in FIG. 7(c), when the feed mechanism 3 has reached the other tread end position of the rubber member 18, the pin 16b of the deflecting mechanism 17b situated above the tread end position is moved downwards until it is brought into contact with the rubber member 18, to change the direction of the carcass cord at the position of the pin 16b and thereby form another deflecting point 20b of the carcass cord.

Figure 7D:
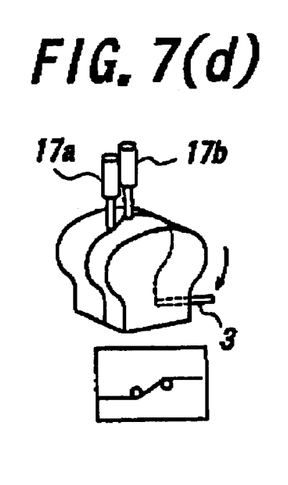

In step 4, the feed mechanism 3 continuously feeding the carcass cord is further moved toward the opposite bead portion of the tire, as shown in FIG. 7(d).

Figure 7E:
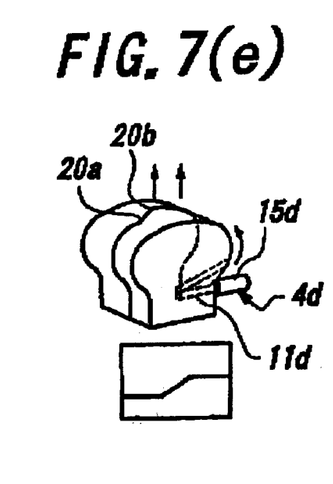

In step 5, as shown in FIG. 7(e), when the feed mechanism 3 has reached the opposite bead portions, the pin 11d of the pressure mechanism 4d situated above the feed mechanism 3 there is moved downwards until it is brought into contact with the rubber member 18, and the indexing mechanism is actuated to rotate the carrier 2 by a predetermined pitch angle so that the carcass cord 7 is wound around the pin 11d to extend in substantially reversed direction.

Figure 7F:
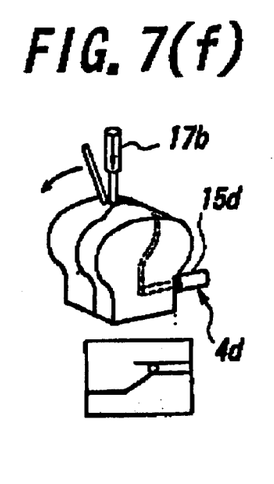
Figure 7G:
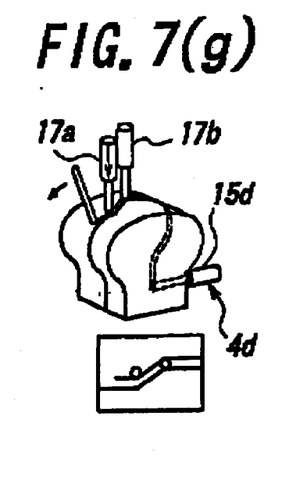

Subsequently, the feed mechanism 3 is moved back toward the initial bead portion while continuously feeding the carcass cord, and the deflecting mechanisms 17a, 17b are successively operated in steps 6 and 7 as shown in FIGS. 7(f) and 7(g), respectively.

Figure 7H:
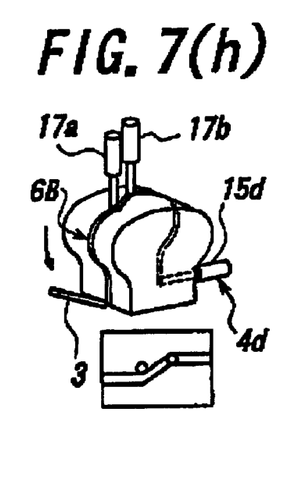

In step 8, as shown in FIG. 7(h), when the feed mechanism 3 has reached the initial bead portion, the pin 11a of the pressure mechanism 4a situated above the feed mechanism 3 there is moved downward until it is brought into contact with the rubber member 18, and the indexing mechanism is actuated to rotate the carrier 2 by a predetermined pitch angle so that the carcass cord 7 is wound around the pin 11d to extend in the initial direction. This condition corresponds to the initial condition for the step 1 explained above. The steps 1 to 8 are repeated to apply the carcass cords 7 on the outer surface of the rubber member 18 in a zigzag manner as seen in the circumferential direction 5 of the carrier 2.

Figure 8A:
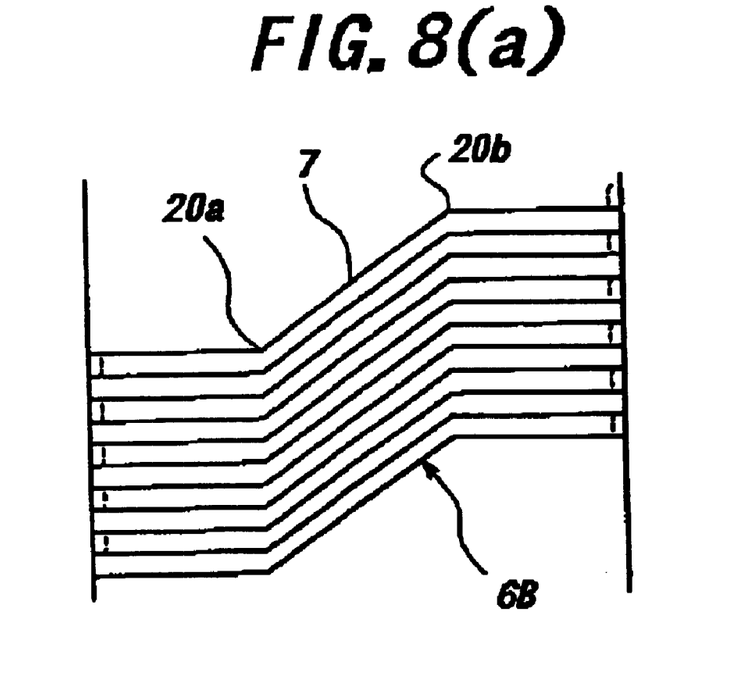
FIGS. 8(a) and 8(b) are plan view and perspective view, respectively, of the carcass produced by the steps of FIGS. 7(a) to 7(h)
Figure 8B:
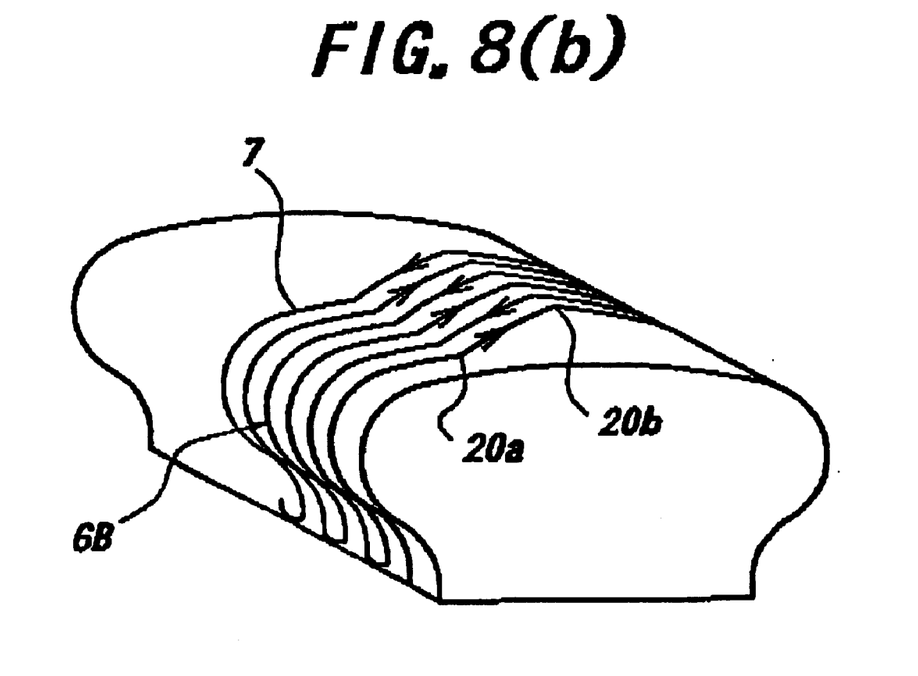

The carcass 6B produced by the apparatus according to the above-mentioned second embodiment is shown in FIGS. 8(a) and 8(b). It can be seen that the carcass 6B has a deflected center portion and bead portions which are completely free from undesirable carcass cord cut surfaces.

It will be appreciated that the present invention provides a practical technology for producing a tire carcass in which the bead portions are free from cut surfaces of the carcass cord, whereby the carcass can be produced efficiently, without requiring noticeably complicated hardware arrangement.

Figure 9A:
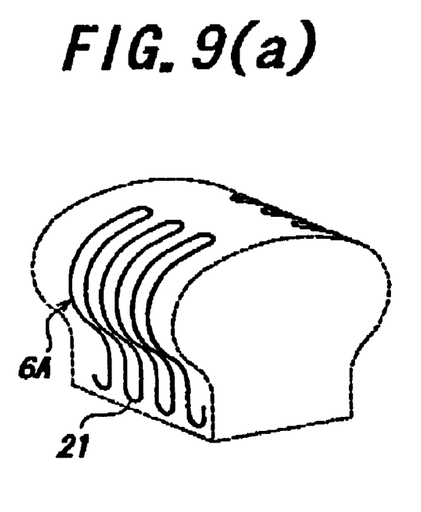
FIGS. 9(a) and 9(b) are perspective views of a carcass having a substantially cordless center region, before and after folding the carcass end portions, respectively.
Figure 9B:
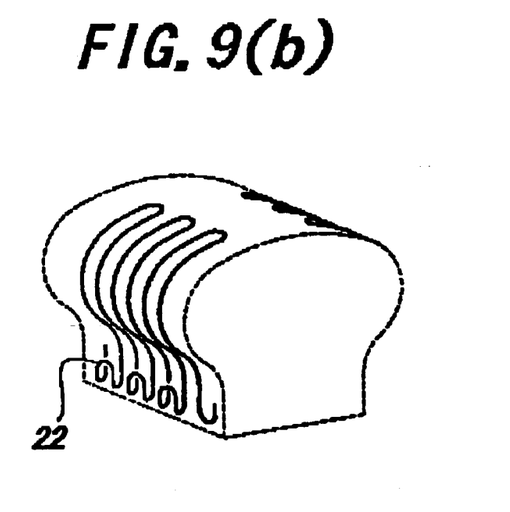
Figure 10A:
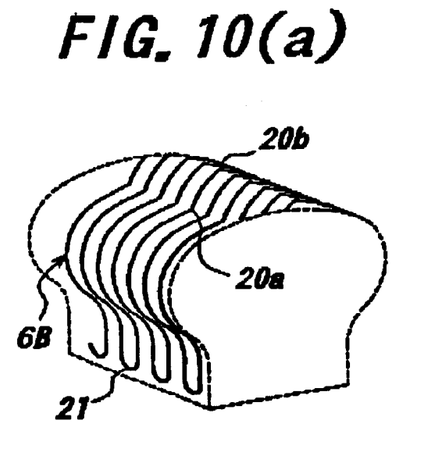
FIGS. 10(a) and 10(b) are perspective views of a carcass having a deflected center region, before and after folding the carcass end portions, respectively.
Figure 10B:
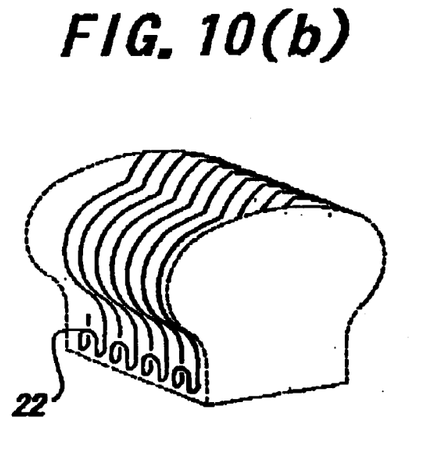
Figure 11A:
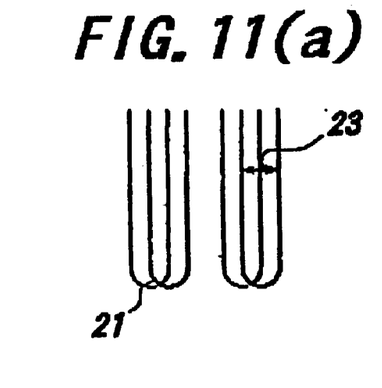
FIGS. 11(a) and 11(b) are explanatory views showing a double pitch arrangement of the carcass cord.
Figure 11B:
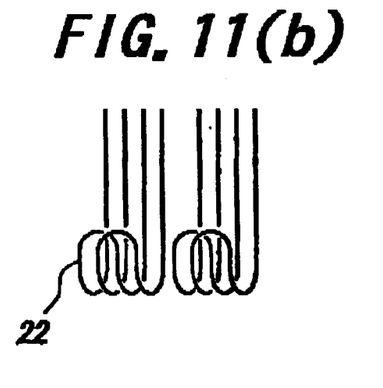

While the present invention has been described above with reference to specific embodiments, it is needless to say that various changes and/or modifications are possible without departing from the scope of the invention. Thus, for example, after formation of the carcass 6A having a substantially cordless center portion as shown in FIG. 9(a), or the carcass 6B having a deflected tread center portion as shown in FIG. 10(a), the inner peripheral portions 21 of the carcass layer may be folded over the respective bead rings (not shown), as shown as 22. Also, a plurality of carcass layers produced as above may be stacked with each other with a circumferential offset amount which corresponds to multiple times of the pitch form the zigzag arrangement of the carcass cord.

What is claimed is:

1. An apparatus for producing a tire carcass, comprising:

a substantially toroidal carrier for supporting a rubber member of a tire;

an indexing mechanism for causing an indexing movement of the carrier by a predetermined angle about a rotational axis of the carrier;

a feed mechanism having a cord outlet guide for feeding a carcass cord toward an outer surface of the carrier, said feed mechanism being reciprocable in the axial direction of the carrier within a surface region thereof, that extends axially of the carrier between positions of the carrier corresponding to a bead portion and a tread end portion of a tire, respectively; and pressure mechanisms forming at least a pair and arranged adjacent to opposite ends of said surface region of the carrier, respectively, so that the carcass cord fed from the feed mechanism is wound about the respective pressure mechanisms and urged thereby toward the outer surface of the carrier, wherein each pressure mechanism of said pressure mechanisms forming the pair further comprises a pin for the carcass cord to wrap around, and a block for restraining the carcass cord, wherein the pin and the block are coaxial, and the pin and the block are urged in respective sequence towards the outer surface of the carrier.

2. The apparatus according to claim 1, comprising two pairs of said pressure mechanisms arranged adjacent to those portions of the carrier, which correspond to opposite bead portions and opposite tread ends of the tire, respectively.

3. The apparatus according to claim 1, wherein said pressure mechanism further comprises drive means for moving the pin into, and out of contact with the outer surface of the rubber member on the carrier.

4. The apparatus according to claim 1, wherein the feed mechanisms each comprise a three-axes actuator that is adapted to move the carcass cord along the outer surface of the carrier.

5. A method of producing a tire carcass, comprising the steps of:

supporting a rubber member on a substantially toroidal carrier;

operating an indexing mechanism and thereby causing an indexing movement of the carrier by a predetermined angle about a rotational axis of the carrier;

operating a feed mechanism synchronously with the indexing mechanism, so that said feed mechanism is reciprocated in the axial direction of the carrier within a surface region thereof, that extends axially of the carrier between positions of the carrier corresponding to a bead portion and a tread end portion of a tire, respectively, and a carcass cord is fed through an outlet guide in the feed mechanism toward an outer surface of the carrier; and operating at least a pair of pressure mechanisms synchronously with the indexing mechanism, said pressure mechanisms being arranged adjacent to opposite ends of said surface region of the carrier, respectively, so that the carcass cord fed from the feed mechanism is wound about the respective pressure mechanisms and urged thereby toward the outer surface of the carrier, wherein operating the at least a pair of pressure mechanisms further comprises wrapping the carcass cord around a pin, restraining the carcass cord by a block that is coaxial with the pin, and wherein the pin and the block are urged in respective sequence towards the outer surface of the carrier.

6. The method according to claim 5, wherein said feed mechanism and said pair of pressure mechanisms are provided for each side of the tire, and the feed and pair of pressure mechanisms on both sides of the tire are operated simultaneously.

* * * * *